(12) United States Patent
Tsai et al.

(10) Patent No.: US 7,846,860 B2
(45) Date of Patent: Dec. 7, 2010

(54) OPTICAL GLASS

(75) Inventors: Tsung-yuen Tsai, Taichung (TW); Hsiang-jen Shih, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 280 days.

(21) Appl. No.: 12/024,369

(22) Filed: Feb. 1, 2008

(65) Prior Publication Data

US 2008/0188368 A1    Aug. 7, 2008

(30) Foreign Application Priority Data

Feb. 1, 2007    (TW) .............................. 96103781 A

(51) Int. Cl.
*C03C 3/068* (2006.01)
*C03C 3/066* (2006.01)

(52) U.S. Cl. .......................... 501/78; 501/79

(58) Field of Classification Search .................. 501/78, 501/79
See application file for complete search history.

(56) References Cited

U.S. PATENT DOCUMENTS

2008/0318758 A1* 12/2008 Imakita et al. ................. 501/51

2009/0111677 A1* 4/2009 Clare et al. .................... 501/78

FOREIGN PATENT DOCUMENTS

| JP | 2000016831 | * | 1/2000 |
| JP | 2006096610 | * | 4/2006 |
| JP | 2007261877 | * | 10/2007 |

* cited by examiner

*Primary Examiner*—Karl E Group

(57) ABSTRACT

An optical glass includes, in percent by weight, 2-11% $SiO_2$, 28-45% $B_2O_3$, 2-15% CaO, 3-18% ZnO, 1-8% $ZrO_2$, 9-40% $La_2O_3$, 0.5-11% $Gd_2O_3$, 0-10% $Y_2O_3$, 0-3% $Al_2O_3$, at most 8% $R_2O$, where $R_2O$ is selected from the group consisting of $Li_2O$, $Na_2O$ and $K_2O$, at most 20% R'O, where R'O is selected from the group consisting of MgO, CaO, SrO and BaO, 0-3% $WO_3$, 0-2% $Nb_2O_5$, and 0-1% $Sb_2O_3$. The optical glass is free from environmental and human harmful components such as PbO and $As_2O_3$. The optical glass has a refractive index in the range of 1.66-1.72, an Abbe number in the range of 51-56, a liquidus temperature (LT) of at most 1000° C. and a raw material melting temperature of at most 1300° C. The optical glass is suitable for mass production, and is stable against devitrification during manufacturing of preforms and precision molding of lenses.

6 Claims, No Drawings

OPTICAL GLASS

BACKGROUND OF THE INVENTION

1. Field of the Invention

The present invention relates to an optical glass, and in particular to an optical glass consisting of improved components to provides high stability against devitrification and high mass production property. The optical glass is also free from environmental and human harmful components, and is suitable for molding at a low temperature.

2. Description of Prior Art

Currently, the performance requirements for photoelectric products, such as digital cameras, are continually increased; the dimensions of these products are required to be further reduced; and the image quality requirements are also continually increased. To meet these requirements, the lens design has become increasingly complicated Aspheric lenses, together with low-cost spherical lenses, must be employed in an optical system to meet the low cost and high quality requirements. Among the known methods for manufacturing aspheric lenses, grinding and polishing are not only very time inefficient, leading to low productivity, but also increases cost. Therefore, precision press molding technology has now become a major and necessary technology for aspheric lens manufacture.

In the case of known mold materials for precision molding, there arises a problem that the higher the molding temperature is, the more oxidation or deterioration the material of the mold itself may have, thus resulting in difficulty in maintenance of the surface accuracy of the mold and in mass production of lenses by the precision molding. Accordingly, to effectively increase the service life of a mold, the precision molding temperature should be reduced.

On the other hand, the precision molding is generally carried out at a high temperature ranging from about 30 to 60° C., which is above the yield point temperature (At) of glass. When the molding temperature exceeds 620° C., OH molecules that adhere to the surface of the glass will react with the mold and ends up decomposing. This decomposition reaction leaves numerous bubbles on the surface of molded glass lenses. Thus, not only does it become difficult to maintain the degree of precision of the transfer surface of the optical part that is molded, but damage is done to the surface precision of the mold material as well, compromising mass production. Therefore, when making an aspheric glass lens with precision press molding, the yield point temperature of the glass used should be as lower as possible and at least lower than 590° C., so as to ensure mass production. Glasses exhibiting a yield point temperature higher than 590° C. can be used to manufacture spherical lenses, prisms and other optical elements. Spherical lenses can be finally formed by grinding and polishing glass performs that are manufactured by reheating and press molding.

In recent years, it has been acknowledged that some glass components, such as PbO and $As_2O_3$, are harmful to human bodies and the environment. Accordingly, optical device manufacturers tend to avoid using these poisonous components in optical glasses. Japanese Patent Unexamined Publication Nos. 06-056463 and 04-002628 each disclose a conventional optical glass exhibiting a yield point temperature lower than 590° C. and a refractive index in the range of 1.66-1.72. The components of these conventional optical glasses contain a large amount of lead oxide, PbO, which is harmful to human bodies and the environment. Further, precision press molding is ordinarily conducted at a high temperature and in a nonreactive atmosphere or a weakly reducing atmosphere to prevent oxidation of the mold. When the glass components containing a large amount of lead oxide are precision pressed, lead oxide is reduced on the glass surface and precipitates onto the glass surface as metallic lead. Further, with repeated press molding, the precipitating metallic lead adheres to the molding surface of the mold, decreasing the precision of the molding surface and eventually causing loss of the surface precision of the transfer surface of the molded product. Thus, maintenance is required to remove the metallic lead adhering to the mold, compromising mass production. Japanese Patent Unexamined Publication No. 10-316448 discloses an optical glass containing arsenic dioxide, $As_2O_3$, which is also poisonous to human bodies. However, simply replacing lead oxide or arsenic dioxide with one or more other components theoretically cannot completely obtain corresponding optical and technical characteristics of lead oxide or arsenic dioxide. Therefore, it is necessary to dramatically reformulate the glass components and their weight percentages.

To prevent the glass from devitrifying during the manufacturing process, which results in poor glass appearance, the liquidus temperature (LT) of glass is preferably as low as possible. That is, the greater the difference between the operating temperature and the glass liquidus temperature is, the smaller the likelihood that the glass tends to devitrify during manufacturing will be. Glass having a high liquidus temperature is liable to devitrify and is therefore poor in mass production. Japanese Patent Unexamined Publication No. 08-259257 discloses a glass having a liquidus temperature greater than 1000° C., and is thus poor in stability.

In addition, it is preferred to have the melting temperature of glass raw materials as low as possible, in order to reduce energy consumption and prolong the service life of furnace used to glass related operations. Japanese Patent Laid-open No. 2000-247676 discloses a glass that has raw materials molten at a high temperature of 1500° C., which consumes a large amount of energy and thus increases the cost.

SUMMARY OF THE INVENTION

An object of the present invention is to provide an optical glass providing high stability against devitrification, having an improved mass production property, being free from environmental and human harmful components, and being suitable for molding at a low temperature and a low cost.

To achieve the above object of the present invention, a lot of studies and experiments have been conducted by the present inventor on optical glasses. These studies have led to an optical glass having the components as defined below. According to the concept of the present invention, the optical glass comprises, in percent by weight, 2-11% $SiO_2$, 28-45% $B_2O_3$, 2-15% CaO, 3-18% ZnO, 1-8% $ZrO_2$, 9-40% $La_2O_3$, 0.5-11% $Gd_2O_3$, 0-10% $Y_2O_3$, 0-3% $Al_2O_3$, at most 8% $R_2O$ (R representing Li, Na, K), at most 20% R'O (R' representing Mg, Ca, Sr, Ba), 0-3% $WO_3$, 0-2% $Nb_2O_5$, and 0-1% $Sb_2O_3$, wherein $SiO_2$, $B_2O_3$, CaO, ZnO, $ZrO_2$, $La_2O_3$, and $Gd_2O_3$ are necessary, essential components.

When the yield point temperature of glass is required to be lower than 590° C., the optical glass of the presnt invention preferably comprises, in percent by weight, 6-11% $SiO_2$, 28-40% $B_2O_3$, 2-12% CaO, 5-18% ZnO, 1-8% $ZrO_2$, 9-30% $La_2O_3$, 1-11% $Gd_2O_3$, 1-10% $Y_2O_3$, 1-7% $Li_2O$, at most 8% $R_2O$ (R representing Li, Na, K), 5-8% of SrO, at most 20% R'O (R' representing Mg, Ca, Sr, Ba), 0-3% $WO_3$, 0-2% $Nb_2O_5$, and 0-1% $Sb_2O_3$.

In comparison with the conventional optical glasses, the optical glass of the present invention consists of components that are free from environmental and human harmful components such as PbO and $As_2O_3$. Further, the optical glass of the the present invention has a refractive index in the range of 1.66-1.72, an Abbe number in the range of 51-56, a liquidus temperature (LT) of at most 1000° C. and a raw material melting temperature of at most 1300° C. Therefore, the optical glass of the present invention is suitable for mass production, and is stable against devitrification during manufacturing of preforms and precision molding of lenses.

DETAILED DESCRIPTION OF THE INVENTION

According to the concept of the present invention, the optical glass of the present invention generally comprises, in percent by weight, 2-11% $SiO_2$, 28-45% $B_2O_3$, 2-15% CaO, 3-18% ZnO, 1-8% $ZrO_2$, 9-40% $La_2O_3$, 0.5-11% $Gd_2O_3$, 0-10% $Y_2O_3$, 0-3% $Al_2O_3$, at most 8% $R_2O$ (R representing Li, Na, K), at most 20% R'O (R' representing Mg, Ca, Sr, Ba), 0-3% $WO_3$, 0-2% $Nb_2O_5$, and 0-1% $Sb_2O_3$, wherein $SiO_2$, $B_2O_3$, CaO, ZnO, $ZrO_2$, $La_2O_3$ and $Gd_2O_3$ are necessary, essential components.

When the yield point temperature of the optical glass is required to be lower than 590° C., the optical glass of the present invention preferably comprises, in percent by weight, 6-11% $SiO_2$, 28-40% $B_2O_3$, 2-12% CaO, 5-18% ZnO, 1-8% $ZrO_2$, 9-30% $La_2O_3$, 1-11% $Gd_2O_3$, 1-10% $Y_2O_3$, 1-7% $Li_2O$, at most 8% $R_2O$ (R representing Li, Na, K), 5-8% SrO, at most 20% R'O (R' representing Mg, Ca, Sr, Ba), 0-3% $WO_3$, 0-2% $Nb_2O_5$, and 0-1% $Sb_2O_3$.

The optical glass of the present invention consists of components that are free from environmental and human harmful components such as PbO and $As_2O_3$. Further, the optic glass of the present invention has a refractive index in the range of 1.66-1.72, an Abbe number in the range of 51-56, a liquidus temperature (LT) of at most 1000° C. and a raw material melting temperature of at most 1300° C. Therefore, the optic glass of the present invention is suitable for mass production, and is stable against devitrification during manufacturing of preforms and precision molding of lenses.

The components of the optical glass of the present invention have been selected for the reasons stated below. In the following description, the content ranges of the respective components are expressed in weight percentage.

The component $SiO_2$ is an essential component and is the ingredient for composing a network structure of glass. It contributes to increase of chemical durability and fluid viscosity of the glass, and decrease of the liquidus temperature LT of the glass. However, if it is added in an amount exceeding 11%, unmelted matter is easily formed during melting and thus the melting temperature must be increased.

The component $B_2O_3$ is an essential component and is the ingredient for composing a network structure of glass similar to $SiO_2$. It is effective for obtaining a homogeneous glass and decreasing the melting temperature. If the amount of $B_2O_3$ is less than 28%, devitrification occurs. If it is more than 45%, the refractive index of the glass is decreased and thus it becomes difficult to obtain a glass with desired refractive index.

The component CaO is an essential component that contributes to decrease of the glass transformation temperature (Tg), the yield point temperature (At) and the liquidus temperature (LT), and also increase of resistance to devitrification. When it is lower than 2%, these effects are not marked. When it is greater than 15%, both the chemical durability and resistance to devitrification become poor.

The component ZnO is an essential component that contributes to increase of the refractive index, maintenance of low color dispersion and improvement of the chemical durability. It is also effective in decreasing the glass transformation temperature Tg, the yield point temperature At and the liquidus temperature LT. When it is lower than 3%, these effects are not marked. When it is greater than 18%, resistance to devitrification becomes poor.

The component $ZrO_2$ is an essential component effective in increasing the refractive index, increasing the resistance to devitrification and improving the chemical durability of the glass. If it is below 1%, these effects are not marked. When it is above 8%, resistance to devitrification becomes poor.

The component $La_2O_3$ is an essential component that contributes to increase of the refractive index, decrease of color dispersion and improvement of the chemical durability of the glass. If it is less than 9%, high refractive index cannot be maintained. If it exceeds 40%, resistance to devitrification becomes poor.

The component $Gd_2O_3$ is an essential component also contributing to increase of the refractive index, decrease of color dispersion and improvement of the chemical durability of the glass. If it is less than 0.5%, these effects are not marked. If it exceeds 11%, resistance to devitrification becomes poor.

The component $Y_2O_3$ is an additive component also contributing to increase of the refractive index, decrease of color dispersion and improvement of the chemical durability of the glass. If it exceeds 10%, resistance to devitrification becomes poor.

The component $Al_2O_3$ is an additive component contributing to increase of chemical durability and fluid viscosity of the glass. When it exceeds 3%, resistance to devitrification is sharply deteriorated.

The components $Li_2O$, $Na_2O$ and $K_2O$ are additive components. When added in proper amounts, the glass yield point temperature, the raw material melting temperature and the glass liquidus temperature can be decreased. However, if the sum of $Li_2O$, $Na_2O$ and $K_2O$ exceeds 8%, resistance to devitrification is sharply deteriorated. Among the three components, $Li_2O$ is especially effective in decreasing the transformation temperature Tg and the yield point temperature At of the glass. When the amount of $Li_2O$ exceeds 7%, resistance to devitrification is deteriorated.

The components MgO, SrO and BaO are additive components. When added in proper amounts, the glass liquidus temperature LT can be decreased, the resistance to devitrification can be increased, and the optical constants of the glass can be effectively adjusted. However, if the sum of MgO, CaO, SrO and BaO exceeds 20%, both the resistance to devitrification and the chemical durability become poor.

The component $WO_3$ is an additive component that is effective for increasing the refractive index and decreasing the liquidus temperature LT. If it exceeds 3%, the coloring property is deteriorated.

The component $Nb_2O_5$ is an additive component that contributes to increase of the refractive index and increase of the meltability of raw materials. Since $Nb_2O_5$ is relatively high in cost, a preferred amount of $Nb_2O_5$ is below 2%.

The component $Sb_2O_3$ is an additive component acting as a defoaming agent. A preferred amount is below 1%.

The optic glass of the present invention can be prepared in a manner as provided below.

Using the corresponding carbonates, nitrates and oxides, etc., as a raw material of each component, the component compositions are first weighed and adequately mixed in a prescribed proportion. These materials are then charged in a quartz crucible or platinum crucible, covered, and melted at a temperature of 1200° C. to 1300° C. The molten mixture is homogenized and refined by stirring, clarified and defoamed, and then poured into a preheated mold for forming. Then, the resulting glass is subjected to annealing at about the glass transformation temperature, and is gradually cooled to the room temperature, to obtain a thermally stable optical glass. The thus obtained optical glass is then measured for the refractive index (nd), the Abbe number (vd), the glass transformation temperature (Tg), the yield point temperature (At) and the liquid phase temperature (LT) as follows. Tables 1 and 2 show the results.

Refractive index (nd) and Abbe number (vd): The optical glass is maintained at the glass transformation temperature for a period of time, cooled at a temperature-decrease rate of −10° C./h for a range of 100° C., and then rapidly cooled to the room temperature. The measurement is carried out by using a refractometer (KPR-200, Kalnew).

Glass transformation temperature (Tg) and yield point temperature (At): The glass is grinded into a cylinder of 5 mm in diameter and 20 mm in length. The measurement is carried out by using a differential scanning calorimeter (BURKER type), at a temperature-increase rate of 5° C./min for measuring the thermal expansion amount.

Liquidus temperature (LT): The measurement is carried out by using a temperature gradient furnace. The glass samples are placed in a platinum boat within the gradient furnace over a wide range of temperature 500 to 1000° C. and held for the required time. After cooled, the inside of each glass is observed through an optical polarizing microscope having a magnification of 100 times for the presence or absence of a crystal, on the basis of which the liquidus temperature is determined.

Tables 1-3 as below show compositions of the optical glass of different embodiments in weight percentage, and the thermal properties (glass transformation temperature (Tg), yield point temperature (Ts), Liquidus temperature (LT)), optical properties (refractive index (nd), Abbe number (vd)) and devitrification test results of the resulting glasses.

TABLE 1

| Component | Sample 1 | Sample 2 | Sample 3 | Sample 4 | Sample 5 | Sample 6 | Sample 7 |
|---|---|---|---|---|---|---|---|
| Weight Percentage (wt %) | | | | | | | |
| $SiO_2$ | 8.20% | 8.95% | 7.50% | 8.20% | 7.32% | 8.20% | 8.48% |
| $B_2O_3$ | 32.90% | 31.20% | 32.90% | 32.90% | 32.90% | 32.90% | 34.55% |
| $Li_2O$ | 5.00% | 4.95% | 5.00% | 4.00% | 5.00% | 6.00% | 4.00% |
| CaO | 6.80% | 7.37% | 6.80% | 6.40% | 6.80% | 6.80% | 8.50% |
| SrO | 7.00% | 6.00% | 6.00% | 6.00% | 6.00% | 6.00% | 7.00% |
| ZnO | 6.90% | 8.73% | 6.60% | 8.90% | 8.80% | 7.90% | 9.40% |
| $ZrO_2$ | 3.90% | 5.50% | 3.90% | 3.50% | 3.90% | 3.90% | 2.85% |
| $La_2O_3$ | 13.00% | 15.00% | 13.00% | 15.00% | 13.00% | 13.00% | 15.00% |
| $Y_2O_3$ | 8.00% | 8.00% | 9.00% | 8.00% | 8.00% | 8.00% | 8.00% |
| $Gd_2O_3$ | 8.10% | 4.10% | 8.40% | 6.10% | 7.20% | 7.10% | 3.22% |
| $Nb_2O_5$ | 0.20% | 0.20% | 0.90% | 1.00% | 1.08% | 0.20% | 0.00% |
| $Sb_2O_3$ | 0.10% | 0.10% | 0.10% | 0.10% | 0.10% | 0.10% | 0.10% |
| Characteristic Values | | | | | | | |
| nd | 1.68225 | 1.68961 | 1.68924 | 1.69007 | 1.68888 | 1.68096 | 1.67957 |
| vd | 54.10 | 52.68 | 53.26 | 53.41 | 52.87 | 53.75 | 54.63 |
| Tg | 510.5° C. | 506.7° C. | 513.7° C. | 527.9° C. | 507.1° C. | 495.6° C. | 524.3° C. |
| Ts | 554.6° C. | 552.1° C. | 560.7° C. | 571.6° C. | 550.5° C. | 537.2° C. | 569.6° C. |
| LT | 980° C. | 915° C. | 980° C. | 950° C. | 950° C. | 950° C. | 910° C. |
| Detrification | No | No | No | No | No | No | No |

TABLE 2

| Component | Sample 8 | Sample 9 | Sample 10 | Sample 11 | Sample 12 | Sample 13 | Sample 14 |
|---|---|---|---|---|---|---|---|
| Weight Percentage (wt %) | | | | | | | |
| $SiO_2$ | 8.95% | 8.70% | 8.95% | 8.48% | 8.95% | 8.20% | 8.95% |
| $B_2O_3$ | 32.15% | 34.94% | 31.51% | 35.55% | 30.69% | 32.90% | 31.64% |
| $Li_2O$ | 4.00% | 4.00% | 4.00% | 4.00% | 4.00% | 0.00% | 4.00% |
| $Na_2O$ | 0.00% | 0.00% | 0.00% | 0.00% | 0.00% | 3.00% | 0.00% |
| $K_2O$ | 0.00% | 0.00% | 0.00% | 0.00% | 0.00% | 1.00% | 0.00% |
| CaO | 6.84% | 8.40% | 8.48% | 8.50% | 9.30% | 9.80% | 7.37% |
| SrO | 6.00% | 6.00% | 6.00% | 6.00% | 6.00% | 0.00% | 6.00% |
| ZnO | 9.26% | 9.26% | 8.26% | 8.40% | 8.26% | 10.90% | 8.73% |
| $ZrO_2$ | 5.50% | 3.43% | 5.50% | 2.85% | 5.30% | 3.90% | 5.50% |
| $La_2O_3$ | 15.00% | 12.67% | 15.00% | 15.00% | 15.00% | 20.30% | 15.00% |
| $Y_2O_3$ | 8.00% | 8.20% | 8.00% | 8.00% | 8.20% | 8.00% | 8.00% |
| $Gd_2O_3$ | 4.10% | 4.40% | 4.10% | 3.22% | 4.30% | 1.80% | 4.61% |
| $Nb_2O_5$ | 0.20% | 0.00% | 0.20% | 0.00% | 0.00% | 0.20% | 0.20% |
| $Sb_2O_3$ | 0.10% | 0.10% | 0.10% | 0.10% | 0.10% | 0.10% | 0.10% |

TABLE 2-continued

| Component | Sample 8 | Sample 9 | Sample 10 | Sample 11 | Sample 12 | Sample 13 | Sample 14 |
|---|---|---|---|---|---|---|---|
| | Characteristic Values | | | | | | |
| nd | 1.69035 | 1.67741 | 1.69146 | 1.67674 | 1.69247 | 1.67450 | 1.69165 |
| vd | 53.27 | 54.94 | 52.90 | 54.93 | 53.23 | 52.45 | 52.88 |
| Tg | 526.9° C. | 526.0° C. | 524.2° C. | 529.6° C. | 519.9° C. | 563.6° C. | 526.0° C. |
| Ts | 565.5° C. | 574.0° C. | 574.4° C. | 573.0° C. | 571.2° C. | 611.8° C. | 575.5° C. |
| LT | 930° C. | 920° C. | 915° C. | 910° C. | 980° C. | 965° C. | 930° C. |
| Detrification | No | No | No | No | No | No | No |

TABLE 3

| Component | Sample 15 | Sample 16 | Sample 17 | Sample 18 | Sample 19 | Sample 20 |
|---|---|---|---|---|---|---|
| | Weight Percentage (wt %) | | | | | |
| $SiO_2$ | 4.00% | 4.00% | 5.46% | 4.00% | 4.00% | 4.00% |
| $B_2O_3$ | 39.10% | 40.10% | 40.10% | 41.66% | 40.10% | 40.10% |
| $Al_2O_3$ | 1.00% | 0.00% | 0.00% | 0.00% | 0.00% | 1.67% |
| CaO | 10.60% | 9.60% | 9.60% | 10.60% | 9.60% | 10.60% |
| BaO | 0.00% | 0.00% | 1.00% | 0.00% | 0.00% | 0.00% |
| SrO | 0.00% | 0.00% | 0.00% | 0.00% | 0.00% | 0.00% |
| ZnO | 5.00% | 6.00% | 5.00% | 5.00% | 6.00% | 5.00% |
| $ZrO_2$ | 4.77% | 4.77% | 4.77% | 1.00% | 1.00% | 4.07% |
| $La_2O_3$ | 32.53% | 32.53% | 31.07% | 36.30% | 36.30% | 31.56% |
| $Gd_2O_3$ | 3.00% | 3.00% | 3.00% | 1.44% | 3.00% | 3.00% |
| $Sb_2O_3$ | 0.00% | 0.01% | 0.01% | 0.01% | 0.01% | 0.01% |
| | Characteristic Values | | | | | |
| nd | 1.69842 | 1.69900 | 1.69142 | 1.68935 | 1.69651 | 1.68986 |
| vd | 54.10 | 54.14 | 54.74 | 56.00 | 55.41 | 54.66 |
| Tg | 638.7° C. | 644.7° C. | 652° C. | 648.4° C. | 648.9° C. | 645.9° C. |
| Ts | 679.6° C. | 680.7° C. | 683.5° C. | 682.5° C. | 686.5° C. | 677.2° C. |
| LT | 950° C. | 980° C. | 920° C. | 990° C. | 1000° C. | 965° C. |
| Devitrification | No | No | No | No | No | No |

The Examples 1-20 of Tables 1-3 show that the optic glass of the present invention basically comprises, in percent by weight, 2-11% $SiO_2$, 28-45% $B_2O_3$, 2-15% CaO, 3-18% ZnO, 1-8% $ZrO_2$, 9-40% $La_2O_3$, 0.5-11% $Gd_2O_3$, 0-10% $Y_2O_3$, 0-3% $Al_2O_3$, at most 8% $R_2O$ selected from the group consisting of $Li_2O$, $Na_2O$ and $K_2O$, at most 20% R'O selected from the group consisting of MgO, CaO, SrO and BaO, 0-3% $WO_3$, 0-2% $Nb_2O_5$, and 0-1% $Sb_2O_3$.

As illustrated by the Examples 1-14 (except Example 13) in Tables 1 and 2, when the yield point temperature of the optical glass is required to be lower than 590° C., the optic glass of the present invention preferably comprises, in percent by weight, 6-11% $SiO_2$, 28-40% $B_2O_3$, 2-12% CaO, 5-18% ZnO, 1-8% $ZrO_2$, 9-30% $La_2O_3$, 1-11% $Gd_2O_3$, 1-10% $Y_2O_3$, 1-7% $Li_2O$, at most 8% $R_2O$ selected from the group consisting of $Li_2O$, $Na_2O$ and $K_2O$, 5-8% SrO, at most 20% R'O selected from the group consisting of MgO, CaO, SrO and BaO, 0-3% $WO_3$, 0-2% $Nb_2O_5$, and 0-1% $Sb_2O_3$. In this preferred embodiment, the content ranges of the respective components in weight percentage are further limited relative to those of the basic embodiment. Specifically, in this preferred embodiment, an amount of 1-7% $Li_2O$ and an amount of 5-8% SrO are further included. As mentioned above, the component $Li_2O$ is especially effective in decreasing the transformation temperature Tg and the yield point temperature At of the glass. When the amount of $Li_2O$ exceeds 7%, resistance to devitrification is deteriorated. When added with SrO in a proper amount, the glass has a decreased glass liquidus temperature LT, and the resistance to devitrification can be increased, and the optical constants of the glass can be effectively adjusted.

Provided below is Table 4 presenting Comparative Examples for reference.

TABLE 4

| Component | Comparative Sample 1 | Comparative Sample 2 | Comparative Sample 3 |
|---|---|---|---|
| | Weight Percentage (wt %) | | |
| $SiO_2$ | 7.0% | 7.41% | 6.0% |
| $B_2O_3$ | 32.5% | 29.74% | 29.0% |
| $Li_2O$ | 2.0% | 2.27% | 2.0% |
| $Na_2O$ | 1.0% | 0.00% | 0.0% |
| $K_2O$ | 0.0% | 0.00% | 5.0% |
| MgO | 4.2% | 0.77% | 0.0% |
| CaO | 0.0% | 6.39% | 10.0% |
| BaO | 0.0% | 8.73% | 0.0% |
| SrO | 9.3% | 0.00% | 0.0% |
| ZnO | 12.0% | 0.00% | 1.0% |
| $La_2O_3$ | 23.0% | 30.93% | 21.0% |
| $Y_2O_3$ | 0.0% | 0.00% | 10.0% |

TABLE 4-continued

| | No. | | |
|---|---|---|---|
| | Comparative Sample 1 | Comparative Sample 2 | Comparative Sample 3 |
| Component | Weight Percentage (wt %) | | |
| $Gd_2O_3$ | 8.0% | 0.00% | 16.0% |
| $As_2O_3$ | 1.0% | 0.00% | 0.0% |
| | Characteristic Values | | |
| nd | 1.6781 | Devitrification Presented | Devitrification Presented |
| vd | 54.7 | | |
| Tg | 542.0° C. | | |
| Ts | 585.0° C. | | |
| LT | 1077° C. | | |

The Comparative Example 1 in Table 4 includes no CaO, contains a very high weight percentage of SrO, exhibits a glass liquidus temperature LT higher than 1000° C., and is poor in mass production. In addition, $As_2O_3$, which is harmful to the environment, is also included in this comparative example. The Comparative Examples 2 and 3 exhibit serious devitrification, and thus are instable in production. Specifically, the Comparative Example 2 includes no ZnO and $Gd_2O_3$, and contains a very high weight percentage of BaO. The Comparative Example 3 contains a very low weight percentage of ZnO and a very high weight percentage of $Gd_2O_3$.

As discussed above, the optic glass of the present invention consists of improved components that are free from environmental and human harmful components such as PbO and $As_2O_3$. Further, the optic glass of the present invention has a refractive index in the range of 1.66-1.72, an Abbe number in the range of 51-56, a liquidus temperature (LT) of at most 1000° C. and a raw material melting temperature of at most 1300° C. Therefore, the optic glass of the present invention exhibits no devitrification, is stable enough to facilitate manufacturing of preforms and precision molding of lenses, and thus is suitable for mass production. Due to the decrease of the liquidus temperature LT, not only the amount control of the glass products manufactured is facilitated, but the electric power is saved as well. The improvement in devitrification increases production yield during manufacturing of glass preforms and precision press molding of lenses. The decrease of the raw material melting temperature reduces wastage of the furnace and the crucible, and also reduces device depreciation and the furnace repairing time.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical glass comprising, in percent by weight, 2-11% $SiO_2$, 28-45% $B_2O_3$, 2-12% CaO, 3-18% ZnO, 1-8% $ZrO_2$, 9-40% $La_2O_3$, 0.5-11% $Gd_2O_3$, 0-10% $Y_2O_3$, 0-3% $Al_2O_3$, at most 8% $R_2O$, where $R_{2O}$ is the total of $Li_2O$, $Na_2O$ and $K_2O$, at most 20% R'O, where R'O is the total of MgO, CaO, SrO and BaO, 1-7% $Li_2O$, 6-8% SrO, 0-3% $WO_3$, 0-2% $Nb_2O_5$, and 0-1% $Sb_2O_3$.

2. The optical glass as claimed in claim 1 exhibiting a refractive index in the range of 1.66-1.72, and an Abbe number in the range of 51-56.

3. The optical glass as claimed in claim 1 having a glass liquidus temperature equal to or lower than 1000° C., and a raw material melting temperature equal to or lower than 1300° C.

4. An optical glass comprising, in percent by weight, 6-11% $SiO_2$, 28-40% $B_2O_3$, 2-12% CaO, 5-18% ZnO, 1-8% $ZrO_2$, 9-30% $La_2O_3$, 1-11% $Gd_2O_3$, 1-10% $Y_2O_3$, 1-7% $Li_2O$, at most 8% $R_2O$, where $R_2O$ is the total of $Li_2O$, $Na_2O$ and $K_2O$, 6-8% SrO, at most 20% R'O where R'O is the total of MgO, CaO, SrO and BaO, 0-3% $WO_3$, 0-2% $Nb_2O_5$, and 0-1% $Sb_2O_3$.

5. The optical glass as claimed in claim 4 exhibiting a refractive index in the range of 1.66-1.72, and an Abbe number in the range of 51-56.

6. The optical glass as claimed in claim 4 having a glass liquidus temperature equal to or lower than 1000° C., and a raw material melting temperature equal to or lower than 1300° C.

* * * * *